(12) United States Patent
Komjathy et al.

(10) Patent No.: US 7,289,061 B2
(45) Date of Patent: Oct. 30, 2007

(54) GENERATING HIGH PRECISION IONOSPHERIC GROUND-TRUTH MEASUREMENTS

(75) Inventors: Attila Komjathy, La Crescenta, CA (US); Lawrence Sparks, La Crescenta, CA (US); Anthony J. Mannucci, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 167 days.

(21) Appl. No.: 11/187,244

(22) Filed: Jul. 22, 2005

(65) Prior Publication Data

US 2006/0017610 A1      Jan. 26, 2006

Related U.S. Application Data

(60) Provisional application No. 60/590,537, filed on Jul. 23, 2004.

(51) Int. Cl.
*G01S 5/14* (2006.01)
(52) U.S. Cl. .................................. 342/357.02
(58) Field of Classification Search ............ 342/357.02
See application file for complete search history.

(56) References Cited

U.S. PATENT DOCUMENTS

| | | | | |
|---|---|---|---|---|
| 5,621,646 | A * | 4/1997 | Enge et al. ................. | 701/120 |
| 5,828,336 | A * | 10/1998 | Yunck et al. .......... | 342/357.02 |
| 6,469,663 | B1 * | 10/2002 | Whitehead et al. .... | 342/357.03 |
| 7,031,730 | B1 * | 4/2006 | Barber et al. ................ | 455/457 |
| 2004/0204852 | A1 * | 10/2004 | Robbins ..................... | 701/214 |

OTHER PUBLICATIONS

Komjathy Atfila et al: "On the Ionospheric Impact of Recent Storm Events on Satellite-Based Augmentation Systems in Middle and Low-Latitude Sectors" Proc. Ion GPS/GNSS 2003, Portland, OR, USA, Sep. 9, 2003, pp. 2769-2776.*
Fraile-Ordonez Jose: "Real-time TEC determination for ionospheric modeling in WADGPS" Proc Ion GPS;☐☐Proceedings of Ion GPS 1995 Inst of Navigation, Alexandria, VA, USA, vol. 2, 1995, pp.☐☐1193-1197.*
Komjathy Attila et al: "On the Ionospheric Impact of Recent Storm Events on Satellite-Based Augmentation Systems in Middle and Low-Latitude Sectors" Proc. Ion GPS/GNSS 2003, Portland, OR, USA, Sep. 9, 2003 pp. 2769-2776, XP002385758.
Fraile-Ordonez Jose: "Real-time TEC determination for ionospheric modeling in WADGPS" Proc Ion GPS; Proceedings of Ion GPS 1995 Inst of Navigation, Alexandria, VA, USA, vol. 2, 1995, pp. 1193-1197, XP002385759.

(Continued)

*Primary Examiner*—Gregory C. Issing
(74) *Attorney, Agent, or Firm*—Gates & Cooper LLP

(57) ABSTRACT

A method, apparatus and article of manufacture provide ionospheric ground-truth measurements for use in a wide-area augmentation system (WAAS). Ionospheric pseudor-ange/code and carrier phase data as primary observables is received by a WAAS receiver. A polynomial fit is performed on the phase data that is examined to identify any cycle slips in the phase data. The phase data is then leveled. Satellite and receiver biases are obtained and applied to the leveled phase data to obtain unbiased phase-leveled ionospheric measurements that are used in a WAAS system. In addition, one of several measurements may be selected and data is output that provides information on the quality of the measurements that are used to determine corrective messages as part of the WAAS system.

21 Claims, 11 Drawing Sheets

OTHER PUBLICATIONS

Smith D A: "Computing unambiguous TEC and ionospheric delays using only carrier phase data from NOAA's CORS network" Position Location and Navigation Symposium, 2004. Plans 2004 Monterey, CA, USA Apr. 26-29, 2004, Piscataway, NJ, USA, IEEE, US, Apr. 26, 2004, pp. 527-537, XP010768917 ISBN: 0-7803-8416-4.

Komjathy Attila et al: "The ionospheric impact of the Oct. 2003 storm event on WAAS" Proc. Int. Tech. Meet. Satell. Div. Inst. Navig. Ion GNSS; Proceedings of the 17th International Technical Meeting of the Satellite Division of the Institute of Navigation, Ion GNSS 2004; Proceedings of the 17th International Technical Meetings of the, 2004, pp. 1298-1307, XP002385760.

Iijima, B.A., I.L. Harris, C.M. Ho, U.J. Lindqwister, A.J. Mannucci, X. Pi, M.J. Reyes, L. C. Sparks, B.D. Wilson (1999). "Automated Daily Process for Global Ionospheric Total Electron Content Maps and Satellite Ocean Altimeter Ionospheric Calibration Based on Global Positioning System." Journal of Atmospheric and Solar-Terrestrial Physics, vol. 61, pp. 1205-1218.

Komjathy, A. (1997). Global Ionospheric Total Electron Content Mapping Using the Global Positioning System. Ph.D. dissertation. Department of Geodesy and Geomatics Engineering Technical Report No. 188, University of New Brunswick, Fredericton, New Brunswick, Canada, 248 pp.

Komjathy, A., B.D. Wilson, T.F. Runge, B.M. Boulat, A.J. Mannucci, L. Sparks and M.J. Reyes (2002). "A New Ionospheric Model for Wide Area Differential GPS: The Multiple Shell Approach." On the CD-ROM of the Proceedings of the National Technical Meeting of the Institute of Navigation, San Diego, CA, Jan. 28-30.

Lawson, C. (1984). "A Piecewise C2 Basis for Function Representation over a Surface of a Sphere." JPL internal document.

Mannucci, A.J., B.D. Wilson, D.N. Yuan, C.H. Ho, U.J. Lindqwister and T.F. Runge (1998). "A Global Mapping Technique for GPS-derived Ionospheric Total Electron Content Measurements." Radio Science, vol. 33, pp. 565-582.

Mannucci A.J., B.A. Iijima, L. Sparks, X. Pi, B.D. Wilson and U.J. Lindqwister (1999). "Assessment of Global TEC Mapping Using a Three-Dimensional Electron Density Model." Journal of Atmospheric and Solar Terrestrial Physics, vol. 61, pp. 1227-1236.

* cited by examiner

Supertruth Algorithm Data Volume Changes for WRE1s
on October 29, 2003

Supertruth Algorithm Data Volume Changes for WRE2s
on October 29, 2003

Supertruth Algorithm Data Volume Changes for WRE3s
on October 29, 2003

GENERATING HIGH PRECISION IONOSPHERIC GROUND-TRUTH MEASUREMENTS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/590,537, filed on Jul. 23, 2004, by Lawrence C. Sparks and Anthony J. Mannucci, entitled "New Algorithm for Generating High Precision Ionospheric Ground-Truth Measurements for FAA's Wide Area Augmentation System,".

STATEMENT REGARDING FEDERALLY SPONSORED RESEARCH AND DEVELOPMENT

This invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The present invention relates generally to ionospheric delay measurements, and in particular, to a method, apparatus, and article of manufacture for generating high-precision ionospheric delay measurements to serve as ground-truth for the Federal Aviation Administration's (FAA) Wide Area Augmentation System (WAAS) algorithm development and validation. Embodiments of the invention may provide an average of thirty percent (30%) improvement in data volume over the prior art.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Global Positioning System (GPS) is a satellite navigation system used to determine one's precise location and provide a highly accurate time reference almost anywhere on Earth or in Earth orbit. However, GPS measurements may have errors based on various causes. The ionosphere is one of the leading causes of GPS measurement error. In this regard, ionospheric storm conditions may cause significant ionospheric delays to occur. The Federal Aviation Administration's (FAA) Wide Area Augmentation System (WAAS) may be used to improve the accuracy and integrity of information coming from GPS satellites. In WAAS, ground stations receive the GPS signals and transmit a corrective signal to account for GPS measurement errors. However, during increased solar activity, significant portions of data that is highly critical for creating the corrective signal is missing. The prior art fails to provide a mechanism for determining and utilizing the missing data. These deficiencies of the prior art may be better understood with a description of WAAS and the missing data.

WAAS is a system of satellites and ground stations that provide GPS signal corrections to provide better position accuracy. WAAS consists of approximately twenty-five (25) ground reference stations positioned across the United States that receive/monitor GPS satellite data. The ground reference stations transmit the GPS satellite data (e.g., via a terrestrial communication network) to two master stations (located on both coasts), that create a GPS correction message (also referred to as an augmentation message). The correction accounts for GPS satellite orbit and clock drift plus signal delays caused by the atmosphere and ionosphere.

The correction message is uplinked to geostationary communication satellites for transmittal/broadcast to WAAS enabled receivers that collect the GPS signals and remove errors in the GPS signals using the corrective information.

Unfortunately, currently existing data sets (provided by the receiving stations) for providing high precision ionospheric delay measurements during ionospheric storm conditions show significant portions of data missing during increased solar activity. This portion of data is highly critical for high precision ionospheric threat model development needed to increase WAAS availability and integrity during ionospheric storm conditions.

SUMMARY OF THE INVENTION

During ionospheric storm conditions (e.g., increased solar activities), ground-truth measurements made by WAAS receiving stations are missing significant portions of data. One or more embodiments of the invention provide a method, apparatus, and article of manufacture that generates and analyze raw GPS data to provide a new generation of ionospheric ground-truth measurements.

The invention comprises two main parts. First, a highly precise interfrequency bias estimation part produces data using GIPSY (GPS-Inferred Positioning SYstem and Orbit Analysis SImulation Software) and GIM (Global Ionospheric Mapping) software packages. The data is cleaned and decimated to 300 seconds and passed through a sequential least squares estimator to obtain high precision satellite and receiver differential biases. Secondly, the raw GPS data is post-processed using nearly co-located GPS receivers to obtain highly precise leveled phase ionospheric measurements not available in real-time.

During subsequent post-processing steps, the measurements for the satellite and receiver interfrequency biases (estimated in the previous step to obtain the unbiased line-of-sight total electron content measurements) are corrected. The cleaned/corrected data sets are then passed through a voting algorithm to select one of the three thread measurements to serve as a ground truth. Subsequently, the data is reformatted and new columns are added to provide additional information on the quality of the individual data points. The output of this process is the final "truth" data, intended to serve as ground-truth for WAAS algorithm development and validation purposes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
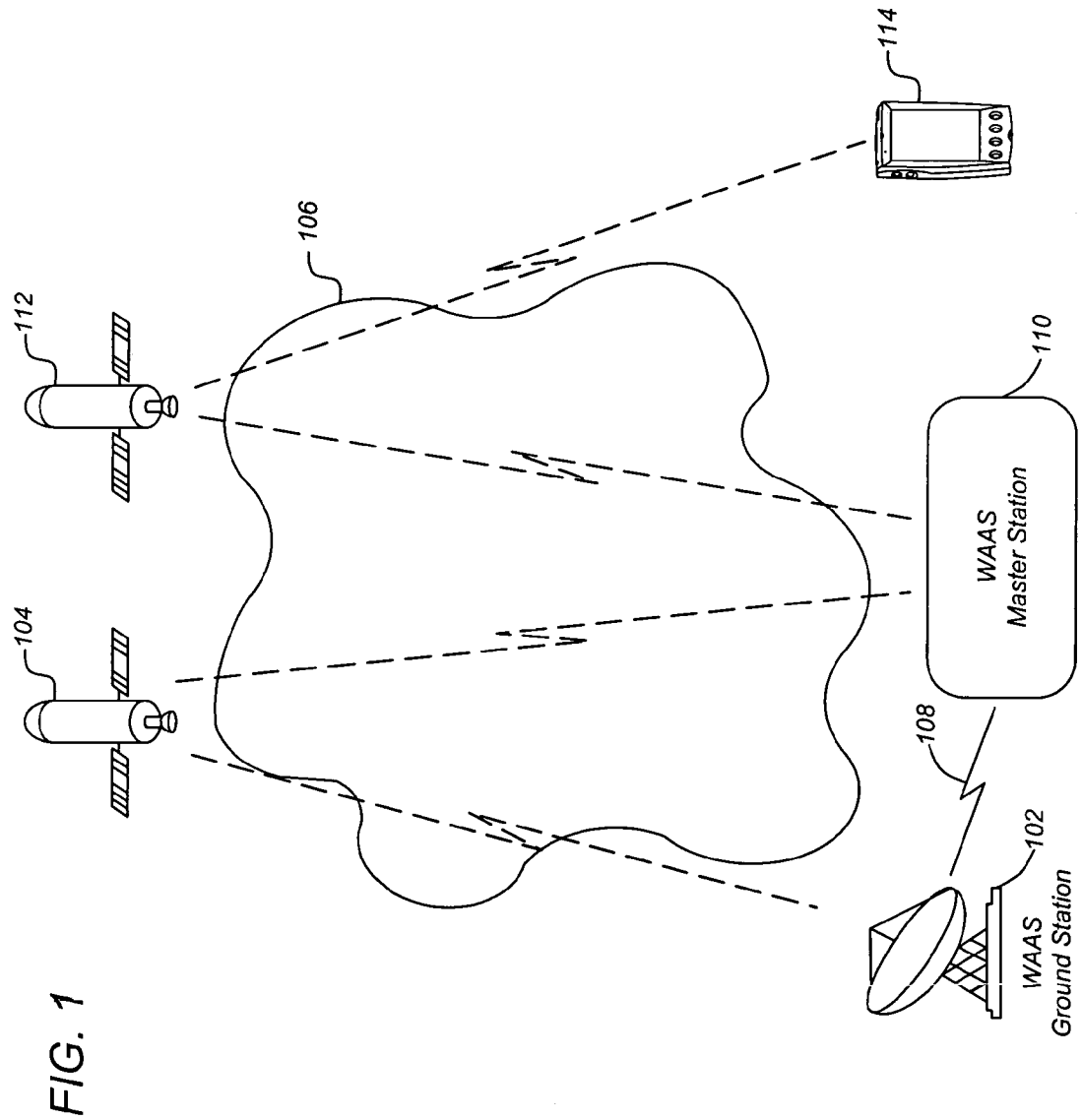
FIG. 1 illustrates a satellite-based system that utilizes WAAS in accordance with one or more embodiments of the invention.

FIG. 1 illustrates a satellite-based system that utilizes WAAS in accordance with one or more embodiments of the invention. As illustrated, one or more WAAS ground receiving stations 102 obtain GPS data from satellite 104 (e.g., through ionosphere or other atmospheric conditions 106. The WAAS ground stations 102 transmit the information (e.g., via terrestrial communication 108 or via satellite 104) to WAAS Master Station 110. WAAS Master Station 110 generates the corrective message/information and uplinks the information to satellite 112. Satellite 112 broadcasts the corrective information which is received by WAAS-enabled GPS devices 114.

Figure 2:
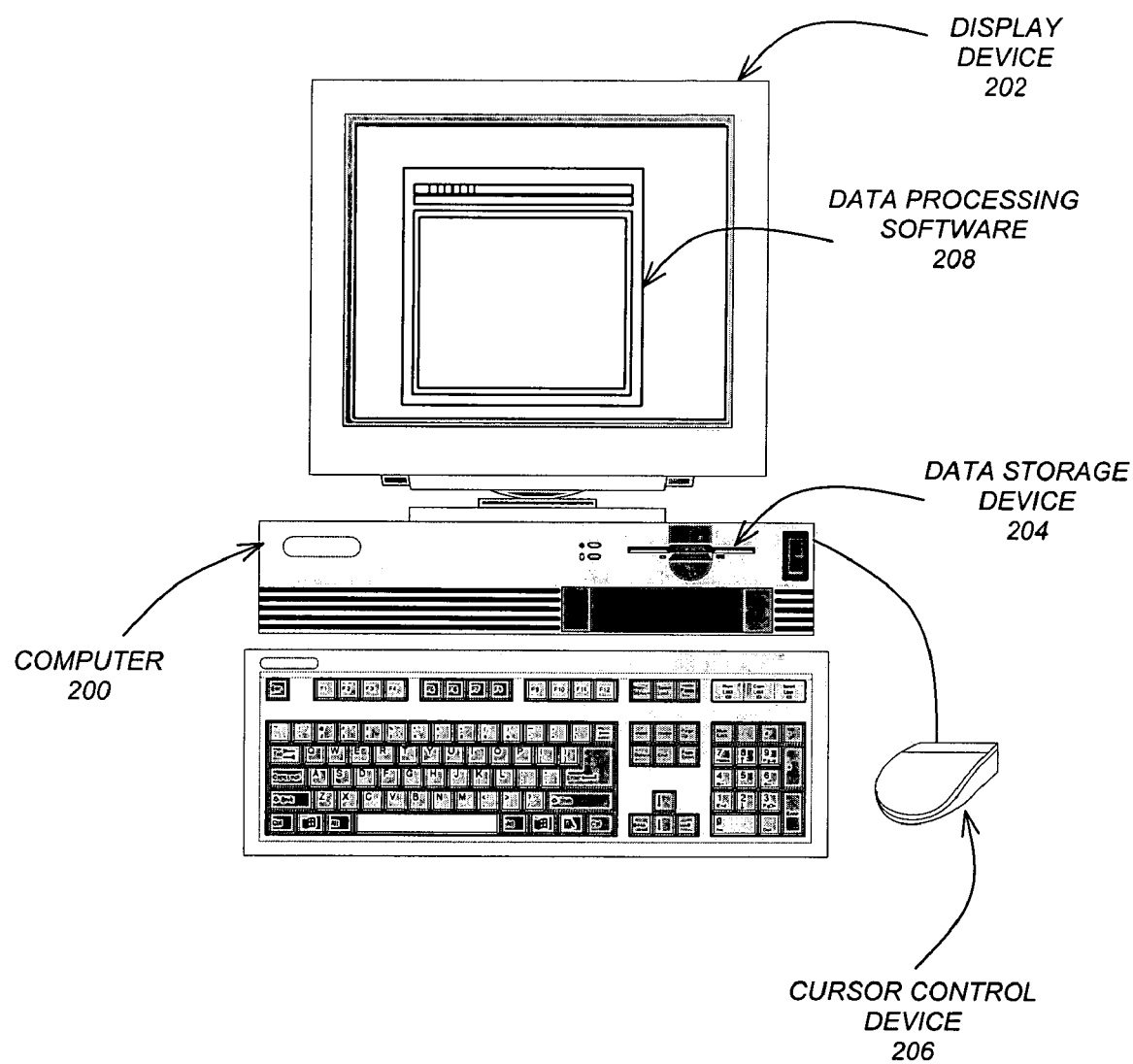
FIG. 2 is an exemplary hardware and software environment used to implement one or more embodiments of the invention.

Computer hardware devices may be used to conduct processing by WAAS Ground Station 102, WAAS Master Station 110, and/or GPS receivers 114. FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented data processing program 208, wherein the data processing program 208 may be represented by a window displayed on the display device 202. However, the processing may also be performed by data processing program 208 automatically without displaying such information on display device 202 and without user intervention. Generally, the data processing program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Bias Estimation

To provide ground-truth, Global Ionospheric Mapping (GIM) software developed at the NASA Jet Propulsion Laboratory [5] may be used to compute high precision slant ionospheric delay by removing the satellite and receiver differential biases from the ionospheric observables, generated from carrier-phase data, adjusted to match the ionospheric delay based on dual-frequency pseudoranges. In addition, NASA's Global Positioning System (GPS)-Inferred Positioning System (GIPSY 2004) software package may be used. Accordingly, 1-s RINEX dual-frequency pseudorange and carrier-phase observations are cleaned and decimated to 300 s and passed through a sequential least squares estimator to obtain the high precision satellite and receiver differential biases. The estimation of the satellite 104 and receiver 114 biases is described herein briefly.

Ionospheric measurements from the 75 WAAS Reference Equipment (WRE) receivers (also referred to as WAAS Ground Receiver Stations) 102 can be modeled with a single-shell ionospheric model using the following observation equation [see e.g. [6] and [3]:

$$TEC = M(h, E)\sum_{i} C_i B_i(lat, lon) + b_r + b_s, \qquad (1)$$

where

TEC is the slant Total Electron Content measured by the linear combination of the GPS dual-frequency carrier phase and pseudorange ionospheric observables, typically expressed in TEC units. One TEC Unit ($10^{16}$electron/$M^2$) corresponds to about 0.163 meter ionospheric delay at the L1 frequency;

M(h, E) is the thin-shell mapping function for ionospheric shell height h and satellite elevation angle E (for the definition of the thin-shell geometric mapping function see e.g. [5] or [2]);

$B_i$(lat, lon) are horizontal basis functions (based on, for example, bicubic splines or bilinear interpolants) evaluated at the ionospheric pierce point (IPP)—the intersection of the received GPS transmission ray path with a thin spherical shell—located at latitude lat and longitude lon on the thin shell;

$C_i$ are basis function coefficients (real numbers); and $b_r$, $b_s$ are the satellite and receiver differential biases, assumed constant over periods of 24 hours or more.

Although there are both single and multi-shell techniques widely used in the ionospheric community, a single-shell approach is used herein for consistency with the technique used in WAAS. The dependence of vertical TEC on latitude and longitude is parameterized as a linear combination of the two-dimensional basis functions $B_i$ which are functions of solar-geomagnetic longitude and latitude [5] (It is noted that the summation in Equation 1 is over all basis functions $B_i$). Using the carrier phase-leveled ionospheric GPS observables, a Kalman filter simultaneously solves for the instrumental biases and the coefficients $C_i$ of the basis functions which are allowed to vary in time as a random walk stochastic process [1]. The basis functions may be based on a bicubic spline technique developed at JPL [4].

High Precision Biased Phase-Leveled TEC Data Generation

To generate high precision ionospheric TEC data, 36-hour RINEX (Receiver Independent Exchange Format) files may be used with 1 second sampling rate using all 75 WRE receivers. In order to retain as much data as possible using the original RINEX files, processing may not use the standard GIPSY data editor (e.g., Turboedit). However, to identify cycle slips, GIPSY module Sanity Edit (e.g., SanEdit) may be used. The cycle-slip criterion (set at 0.8 meter) may be intentionally set loose in order to permit processing possible rapid ionospheric variations due to irregularities.

The Sanity Edit Module(SanEdit)

For each (possibly) continuous phase arc:

(1) A polynomial fit is performed on the L1-L2 phase observables (L1-L2 is the ionospheric combination of GPS observables, also written as LI). The polynomial degree is 4+[length of arc in hours].

(2) The L1-L2 data (minus the fit) is examined for the largest jump between adjacent points.

(3) If the largest jump is larger than the slip detection parameter, then that jump is interpreted either as an outlier or a cycle slip.

(4) If a cycle slip or outlier is detected, repeat the entire process. If no slip or outlier is detected, the processing is complete.

Since the purpose of the supertruth data processing is to keep as many data points as possible, the slip detection parameter used in SanEdit may be large (e.g., 0.8 meters). Slips that small are rare—slips are typically very large. Therefore, it may be expected that SanEdit will be very efficient in flagging cycle slips. In this regard, a visual check of the processed data may find no obvious cycle slips remaining in the data.

A slip parameter that is small may insert too many cycle slips (and, therefore, may not be used): the accuracy of the "leveling" depends very much on the arc length and excessive slips degrades data accuracy, and very short arcs are typically useless. However, unflagged slips may corrupt the data.

In addition, data arcs less than 5 minutes in duration may be removed. A five (5) second smoothing window to smooth the 1-second pseudorange observations in order to mitigate multipath error on the code measurements.

Leveling the Phase Using the Code Measurements

The level is computed by averaging PI-LI using an elevation-dependent weighting. Higher elevation data is weighted more heavily. (The weighting is based on historical Turborogue PI-LI noise/multipath data giving a historical PI-LI scatter of $\sigma_{th}(E)$ where E is elevation). Specifically, the level is computed as:

$$L = \frac{\sum_i \frac{1}{\sigma_{th}(E(t_i))^2}(PI(t_i) - LI(t_i))}{\sum_i \frac{1}{\sigma_{th}(E(t_i))^2}},$$

where E is the elevation angle. The uncertainty on the level is computed using a combination of $\sigma_{th}(E)$ and observed pseudorange scatter:

$$Scatter from\, \sigma_{th} = \sqrt{\frac{1}{N}\sum_i \sigma_{th}(E(t_i))^2},$$

$$True scatter = \sqrt{\frac{1}{N-1}\sum_i (PI(t_i) - LI(t_i) - L)^2},$$

$$Uncertnty from\, \sigma_{th} = \left(\sum_i \frac{1}{\sigma_{th}(E(t_i))^2}\right)^{-1/2},$$

$$Level uncertnty = Uncertnty from\, \sigma_{th} \frac{True scatter}{Scatter from\, \sigma_{th}},$$

where N is the number of data points. Note that for very short arcs, the elevation weighting has almost no effect on the average, and the level uncertainty approximately reverts to Truescatter/sqrt(N). The TEC sigma in the JPL Supertruth data files represents the uncertainty in the level of the data.

Figure 3:
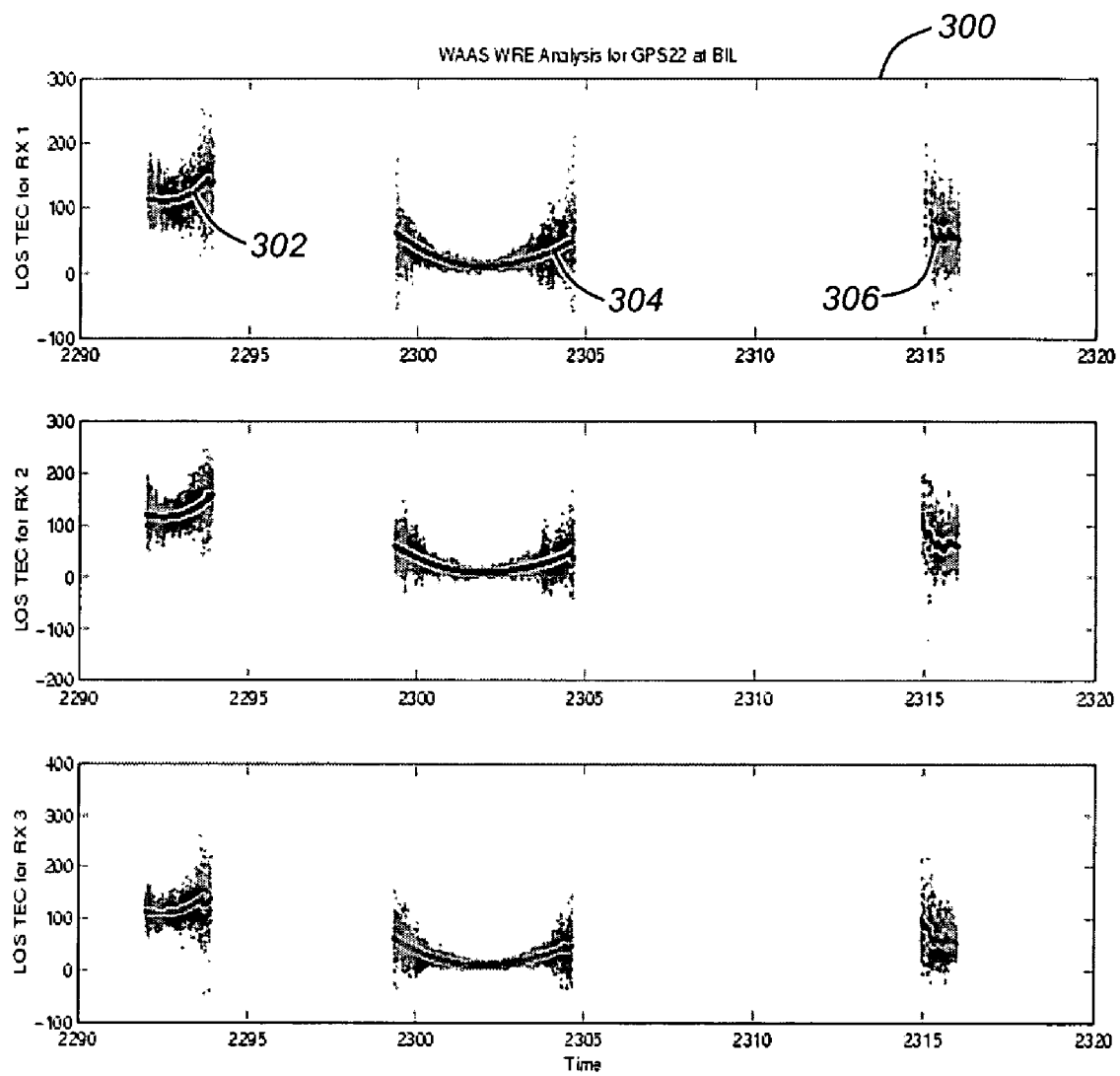
FIG. 3 illustrates the noise level (multipath and measurement noise) of both GPS ionospheric observables in accordance with one or more embodiments of the invention.

FIG. 3 illustrates the noise level (multipath and measurement noise) of both GPS ionospheric observables. Each panel represents one thread of the triple redundant WREs. The phase and code ionospheric observables are plotted together after bias removal and phase-leveling. As an example, GPS22 300 indicates three distinct arcs 302, 304, and 306 with different arc lengths. The multipath and measurement noise levels of the code measurement are different for each arc which will have significant impact on leveling the phase using the code measurements.

Post Processing

After obtaining the five (5) second leveled carrier phase ionospheric observables and the complete set of satellite and receiver interfrequency biases above, the biases are applied to the ionospheric measurements to obtain un-biased phase-leveled ionospheric TEC measurements. TEC measurements may be obtained separately for WRE1, WRE2 and WRE3 threads. In a subsequent step, a supertruth voting scheme may be applied to select one of the three measurements as truth. In this regard, a voting scheme provides the ability to select the best measurements.

One or more of the floor criteria below may be used to select one of out three data points (TEC_THRESH3) or one out of two data points (TEC_THRESH2) depending on the availability of three or two measurement threads. A 20% criterion (TEC_THRESH3_20_PERCENT) may be applied (that all three threads agree within this range) when all three threads are available, and a 40% criterion may be applied when only two threads are available (agreement of two threads within 40%). A TEC upper and lower bounds may also be set as a sanity criteria. Finally, TEC sigma criterion may be set to a loose 10 TECU criterion to minimize data loss. Accordingly, the selection criteria may provide:

An example of an output file generated to analyse the results of the voting mechanism is provided below. The output file provides a detailed account of the data loss at the individual steps. The example below shows that 95 percent of the original data was kept in the supertruth files and only about 5 percent of the data was removed due to failing one of the criteria outlined above.

| Counts of Data Points | | | | | |
|---|---|---|---|---|---|
| Number of 'Good' points. (These are points that passed the upper and lower tec boundaries, and had sigma below the threshhold) | | | | | |
|  | WRE1 | WRE2 | WRE3 | | |
| Total Data Points: | 5573782 | 5590433 | 5324448 | | |
| Bad Lines: | 0 | 0 | 0 | | |
| TEC Lower Failures: | 1223 | 1384 | 872 | | |
| TEC Upper Failures: | 0 | 0 | 10 | | |
| Sigma Failures: | 14165 | 11682 | 8058 | | |
| Good Data Points: | 5558394 | 5577367 | 5315508 | | |
| Number of 'Truth' points. (These are points that had tracks for all three WREs, and for all three pairs of TEC values, had at least one pair which had an absolute difference of less than 10.0 The pair failure counts all individual failures, however, in order for a track to be excluded. | | | | | |
|  | WRE1 | WRE2 | WRE3 | WRE12 | WRE13 | WRE23 |
| NotAll3 Failures: | 12746 | 16995 | 10867 | 87147 | 53836 | 68560 |
| Pair Failures: | 1343421 | 1145584 | 1113957 | 687524 | 655897 | 458060 |
| The statistics immediately above must be compiled into three groups, namely WRE1, WRE2, WRE3, for counting purposes. This will remove the double counting inherent in these statistics. Also, the 'Blocks Missing' line is the number of data points thrown away due to missing times in the other WREs | | | | | |
|  | WRE1 | WRE2 | WRE3 | | |
| Good Data Points: | 5558394 | 5577367 | 5315508 | | |
| Blocks Missing: | 0 | 0 | 0 | | |
| NotAll3 Failures: | 153729 | 172702 | 133263 | | |
| Pair Failures: | 69158 | 69158 | 63311 | | |
| Truth Points in data: | 5335507 | 5335507 | 5118934 | | |
| Implicit in the counting is the contribution of what are 'ghost' points. This is a direct result of SuperTruth2. If two WREs have points at a given site and the third does not (for the entire time period), SuperTruth2 allows data to be generated from this site. Since data is coming from this site, it is as if the third WRE has data coming from it. For counting purposes, the number of these 'ghost' points may be tracked. | | | | | |
| Truth Points in data: | 5335507 | 5335507 | 5118934 | | |
| Ghost Points: | 0 | 0 | 216573 | | |
| Truth Points: | 5335507 | 5335507 | 5335507 | | |
| Total Truth Points: | 5335507 | | | | |
| Percentages of Data Points (without ghost points) | | | | | |
| TEC Lower Failures: | 0.02 | 0.02 | 0.02 | | |
| TEC Upper Failures: | 0.00 | 0.00 | 0.00 | | |
| Sigma Failures: | 0.25 | 0.21 | 0.15 | | |
| Blocks Missing: | 0.00 | 0.00 | 0.00 | | |
| NotAll3 Failures: | 2.76 | 3.09 | 2.50 | | |
| Pair Failures: | 1.24 | 1.24 | 1.19 | | |
| Truth Points: | 95.73 | 95.44 | 96.14 | | |
|  | 100.00 | 100.00 | 100.00 | | |

```
#define TEC_LOWER_BOUND           -3.0
#define TEC_UPPER_BOUND          650.0
#define TECSIGMA_THRESH           10.0
#define TEC_THRESH3               10.0
#define TEC_THRESH2               20.0
#define TEC_THRESH3_20_PERCENT     0.2
#define TEC_THRESH2_40_PERCENT     0.4
```

Once the supertruth file is obtained, additional columns may be added to prior data. For example, the extra columns may include the X,Y,Z of the satellites (Earth-centered geocentric coordinates), the difference in TEC between the supertruth value and the next closest thread value, satellite arc length in hours, and the highest elevation angle in degrees. An example format (i.e., different columns $c1$, $c2$, $c3$, etc.) of the supertruth file follows:

$c1$: Time in J2000 sec, $c2$: WRE ID, $c3$: Sat ID, $c4$: TEC in TECU, $c5$: Sigma in TECU, $c6$: Azimuth in Degrees, $c7$: Elevation angle in Degrees, $c8$: Receiver Bias in TEC, $c9$: Satellite Bias in TEC, $c10$: Latitude of station in degrees, $c11$: Longitude of Station in degrees, $c12$: Height of station in meters, $c13$: X, $c14$: Y, and $c15$: Z satellite position in km (Earth-centered coordinates), c16: Difference to the closest track in TECU, c17: arc length in hours, c18: highest elevation angle of the arc in hours.

Examples of Improvement Over Old Supertruth

Figure 4:
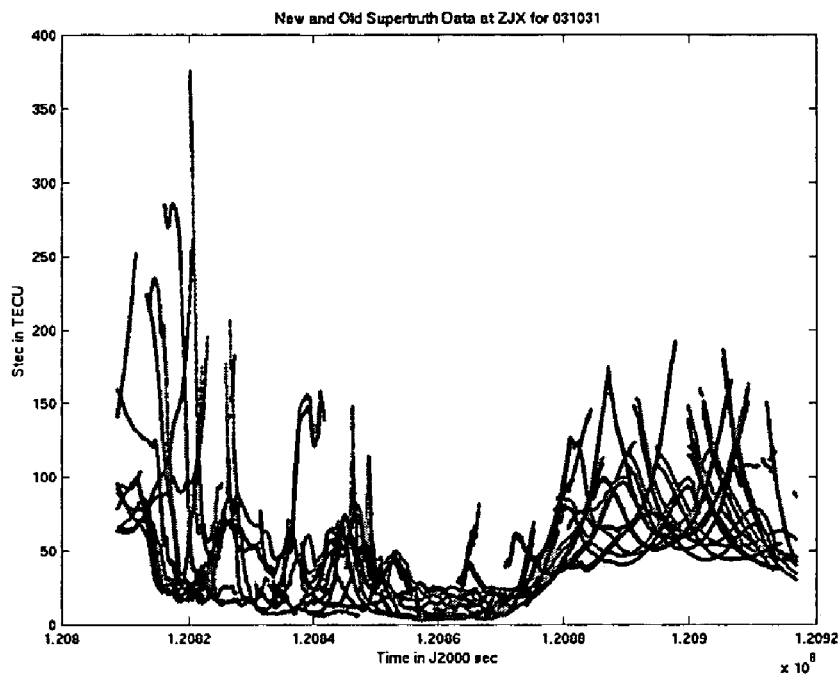
FIG. 4 illustrates the new and old supertruth data at ZJX (Jacksonville, Fla. area) on Oct. 31, 2003. in accordance with one or more embodiments of the invention.
Figure 5:
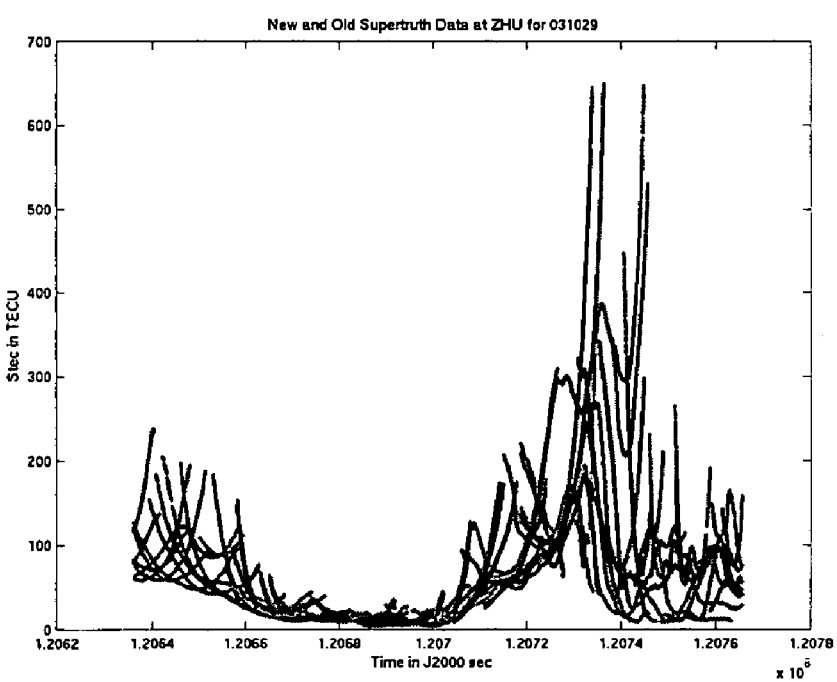
FIG. 5 illustrates the new and old supertruth data at ZHU (Houston, Tex. area) on Oct. 29, 2003 in accordance with one or more embodiments of the invention.
Figure 6:
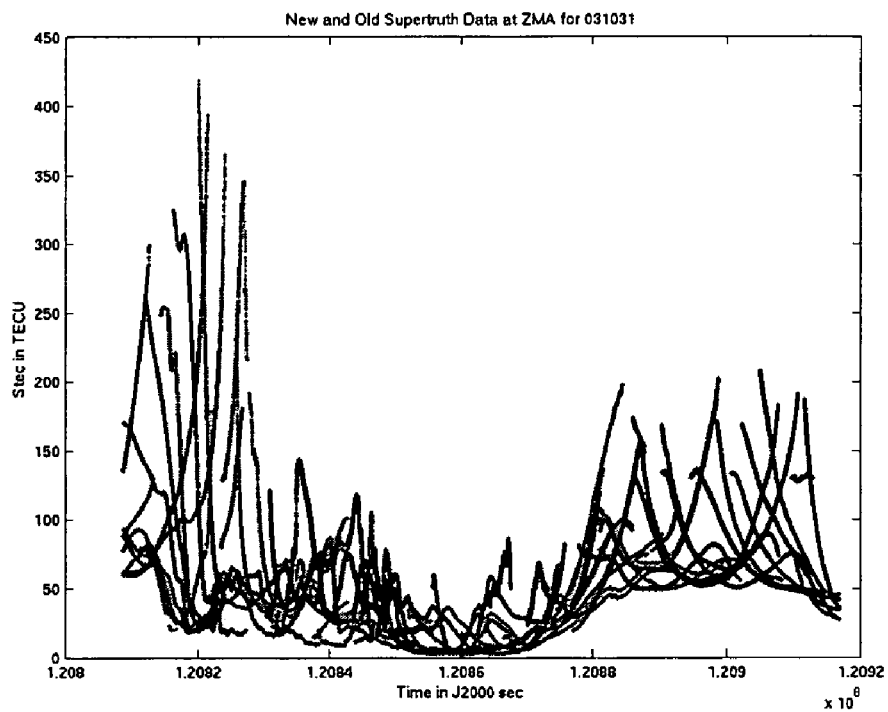
FIG. 6 illustrates the new and old supertruth data at ZMA (Miami, Fla. area) on Oct. 31, 2003 in accordance with one or more embodiments of the invention.
Figure 7:
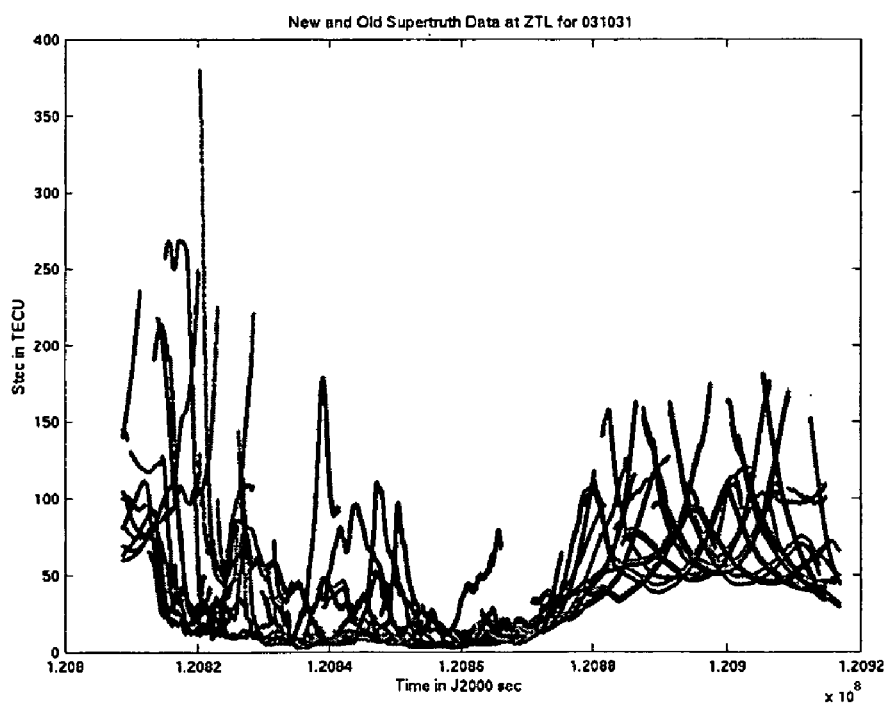
FIG. 7 illustrates the new and old supertruth data at ZTL (Atlanta, Ga. area) on Oct. 31, 2003 in accordance with one or more embodiments of the invention.

A few examples demonstrate the improvement achieved with the above described supertruth scheme over prior art methods. The example is based on a geomagnetic storm that occurred between Oct. 28-31, 2003. FIGS. 4 through 7 display the old (blue or black) and the new (red or gray) slant TEC measurements. FIG. 4 illustrates the new and old supertruth data at ZJX (Jacksonville, Fla. area) on Oct. 31, 2003. FIG. 5 illustrates the new and old supertruth data at ZHU (Houston, Tex. area) on Oct. 29, 2003. FIG. 6 illustrates the new and old supertruth data at ZMA (Miami, Fla. area) on Oct. 31, 2003. FIG. 7 illustrates the new and old supertruth data at ZTL (Atlanta, Ga. area) on Oct. 31, 2003.

It is clear that more data points are recovered in the new supertruth process. More measurements points are obtained at low elevation angles. It is also evident that during night-time, in the old supertruth process there were large data gaps. In the new supertruth process, these gaps appear to have been filled. The new supertruth processing is based on 36 hours of data as opposed to 24 hours for the old scheme. This provides for increased performance in leveling the data at the day boundaries as evident in the FIGS. 4-7 that show more gray data points at the beginning and end of the day. Furthermore, the overlap of the gray and black lines indicates that the leveling and biases estimation processes are working as desired.

Figure 8A:
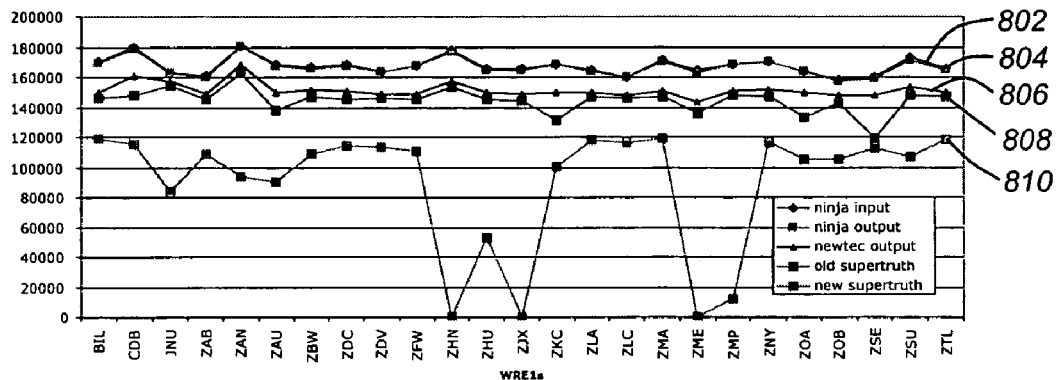
FIGS. 8A-8C illustrate the data volume changes for WRE1 (FIG. 8A), WRE2 (FIG. 8B) and WRE3 (FIG. 8C) as the data processing steps are completed in accordance with one or more embodiments of the invention.
Figure 8B:
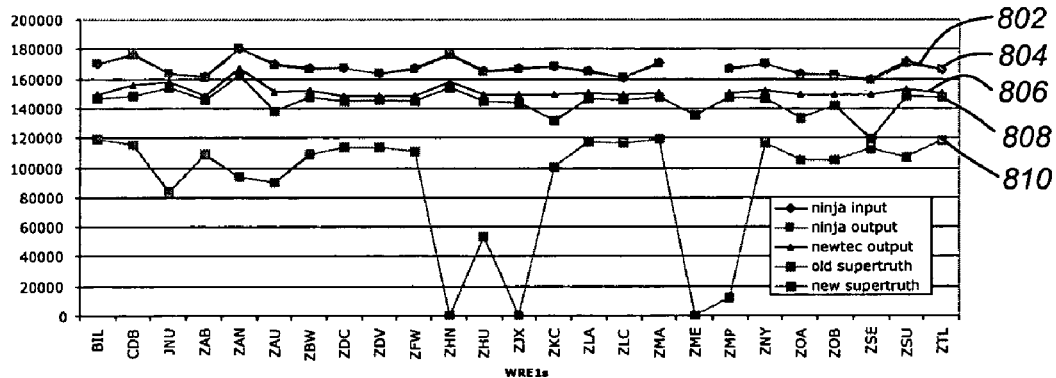
Figure 8C:
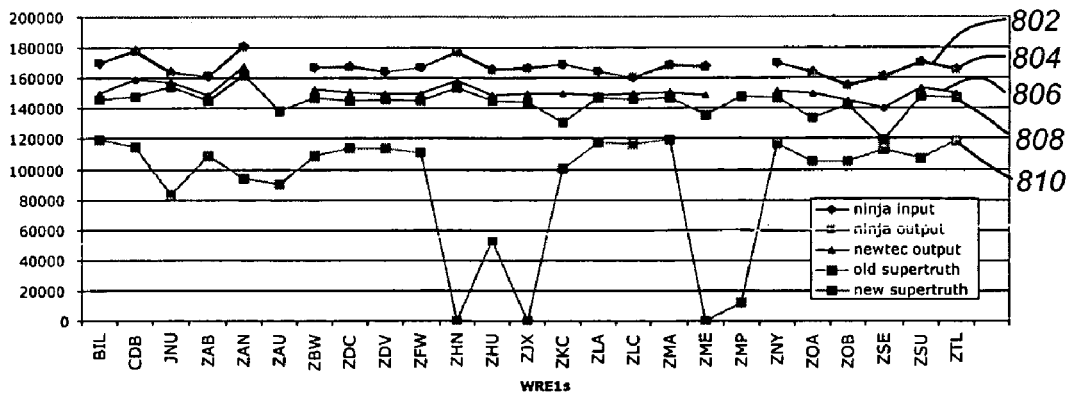

FIGS. 8A-8C illustrate the data volume changes for WRE1 (FIG. 8A), WRE2 (FIG. 8B) and WRE3 (FIG. 8C) as the data processing steps are completed. The software module "ninja" input 802 represents the raw data volume obtained from the RINEX file. The ninja output 804 corresponds to the data loss due to the Sanity Check editing procedure described above. The software module "newtec" curve 806 shows the data volume after the leveling process is completed. The final data volume is also displayed and denoted as new supertruth (808) and old supertruth (810). The overall data volume improvement is at the 30% level ranging between 10 and 50%.

Figure 9:
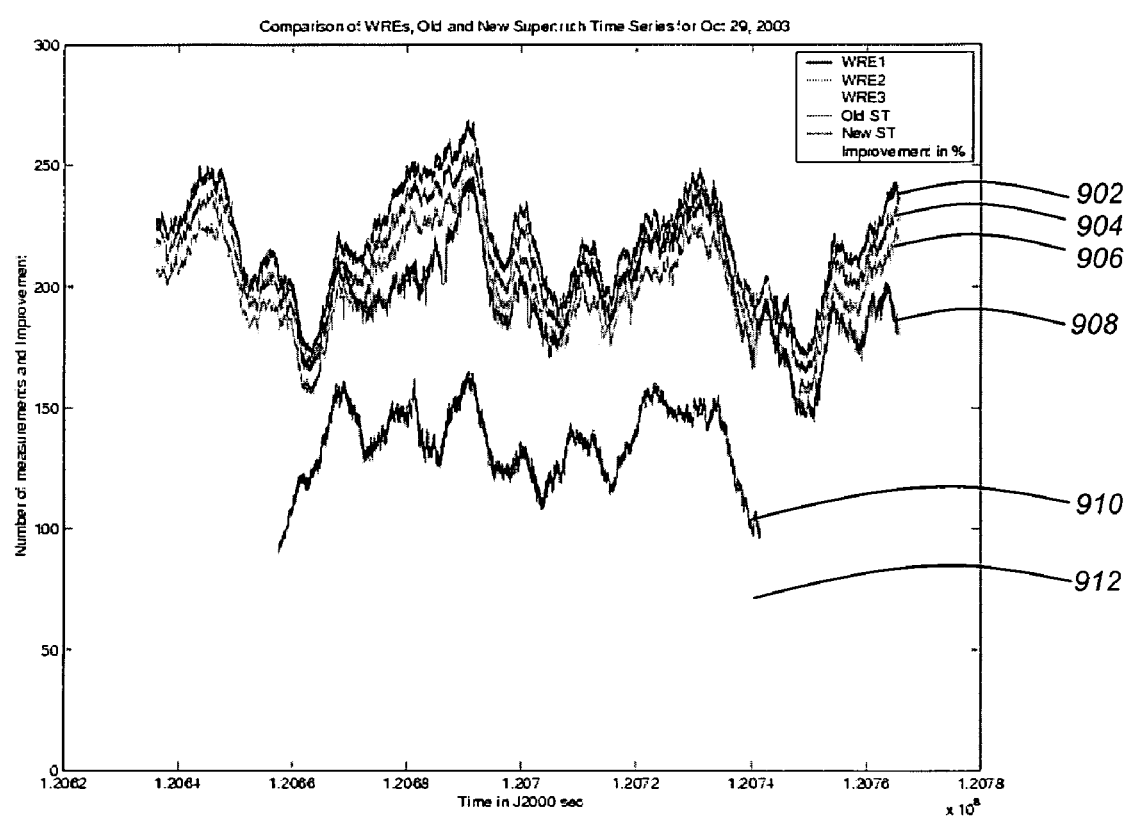
FIG. 9 shows the number of data points per epoch as a function of time in accordance with one or more embodiments of the invention.

FIG. 9 shows the number of data points per epoch as a function of time. It is clear that the WRE1 902, 2 904, and 3 906 curves show a very similar number of data points. The new supertruth data volume 908 overlaps with the WRE curves 902-906 while the old supertruth data volume 910 is smaller. Data volume improvement 912 is at the 20-50% level.

Figure 10:
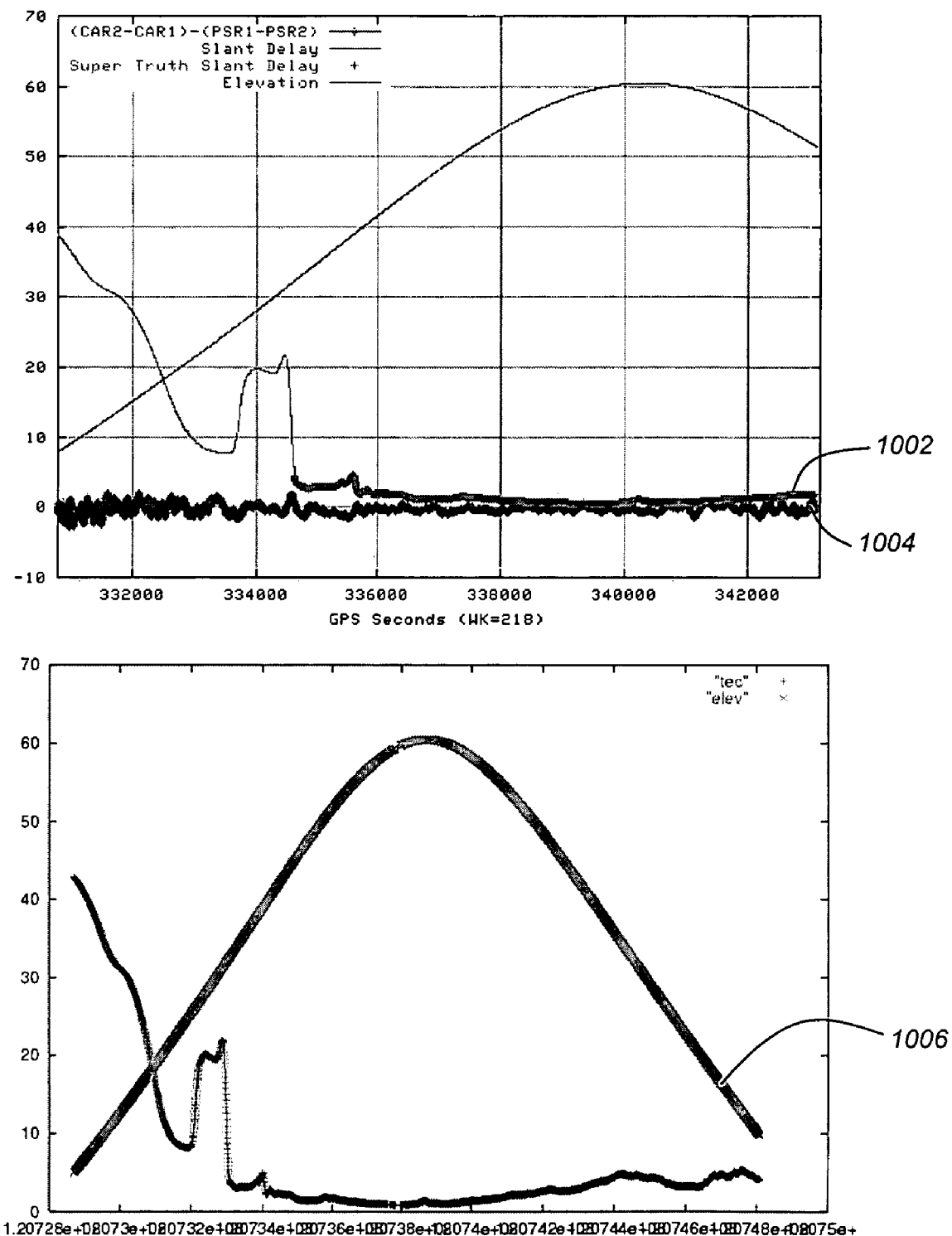
FIG. 10 illustrates a comparison of old and new supertruth values at ZDC (Leesburg, Va. area) for PRN11 (Pseudo Random Noise Code 11) on Oct. 29, 2003 in accordance with one or more embodiments of the invention.
Figure 11:
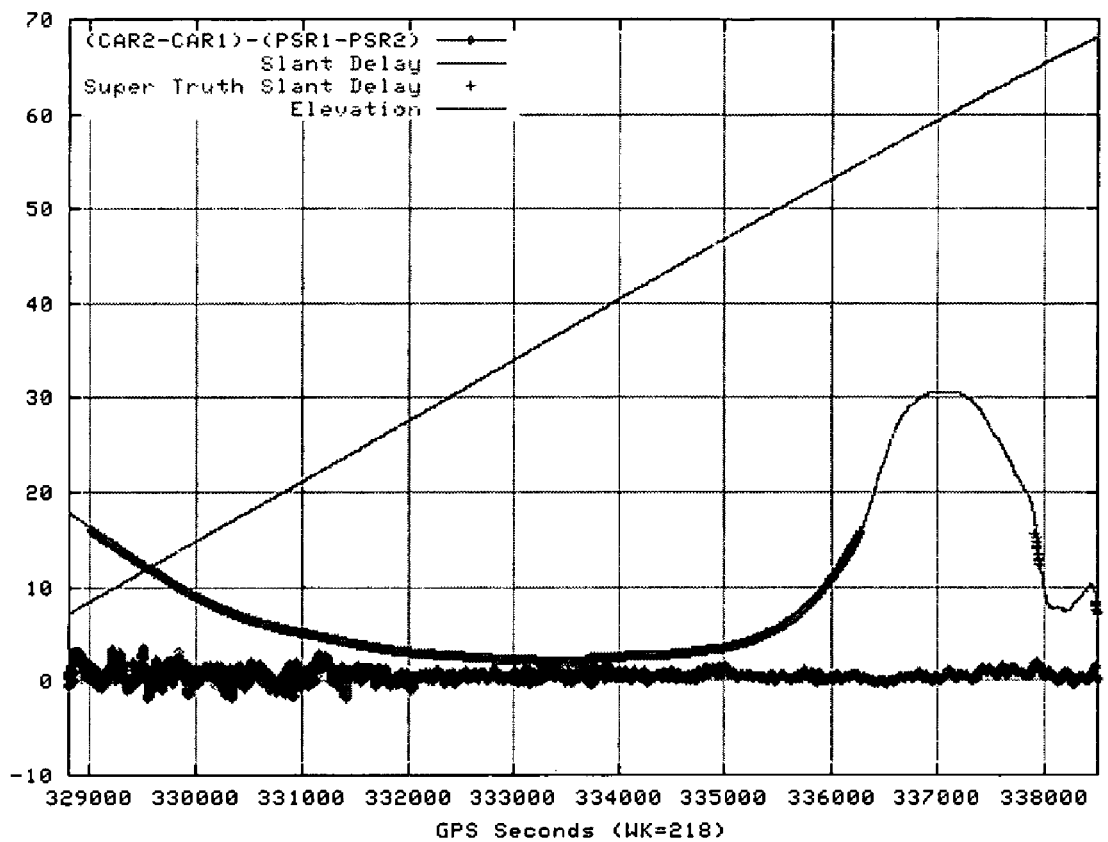
FIG. 11 illustrates new supertruth values at BIL (Billings, Mont. area) for PRN28 on Oct. 29, 2003 in accordance with one or more embodiments of the invention.
Figure 11:
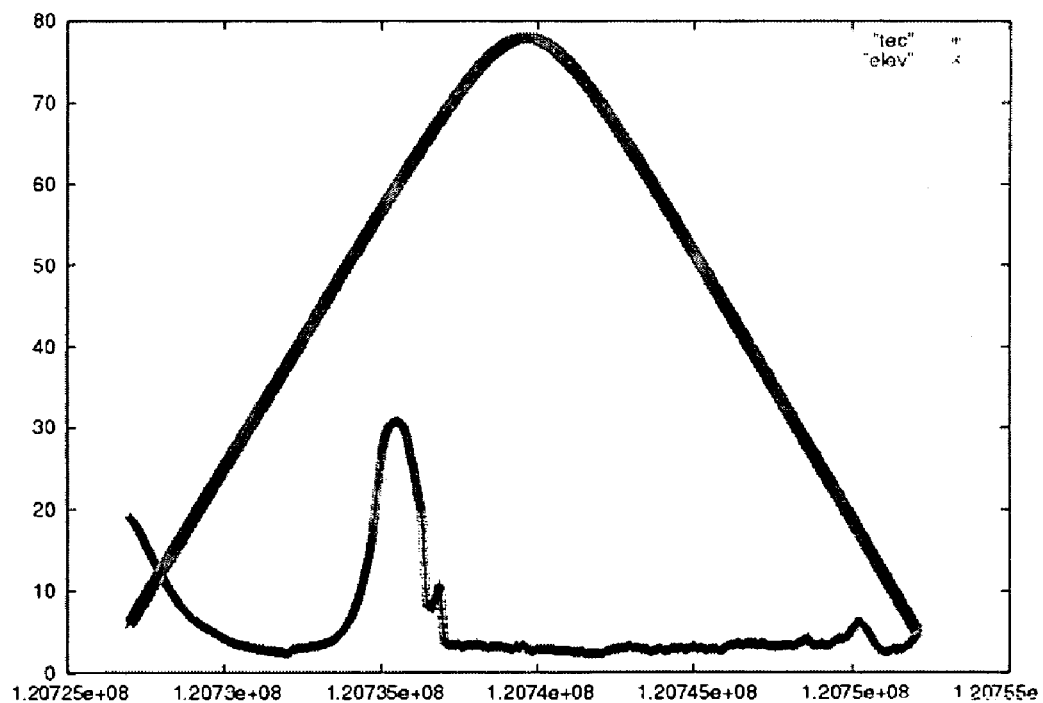
Figure 12:
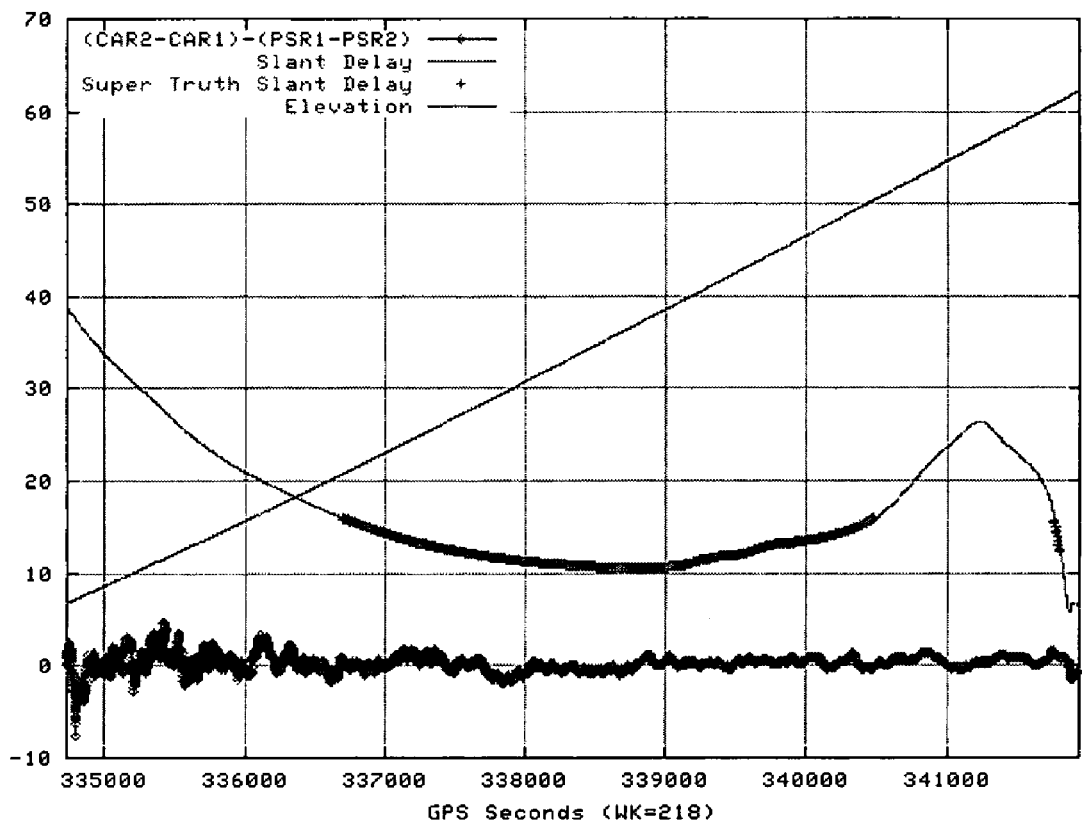
FIG. 12 illustrates new supertruth values at ZSE (Auburn, Wash. area) for PRN 7 on Oct. 29, 2003 in accordance with one or more embodiments of the invention.
Figure 12:
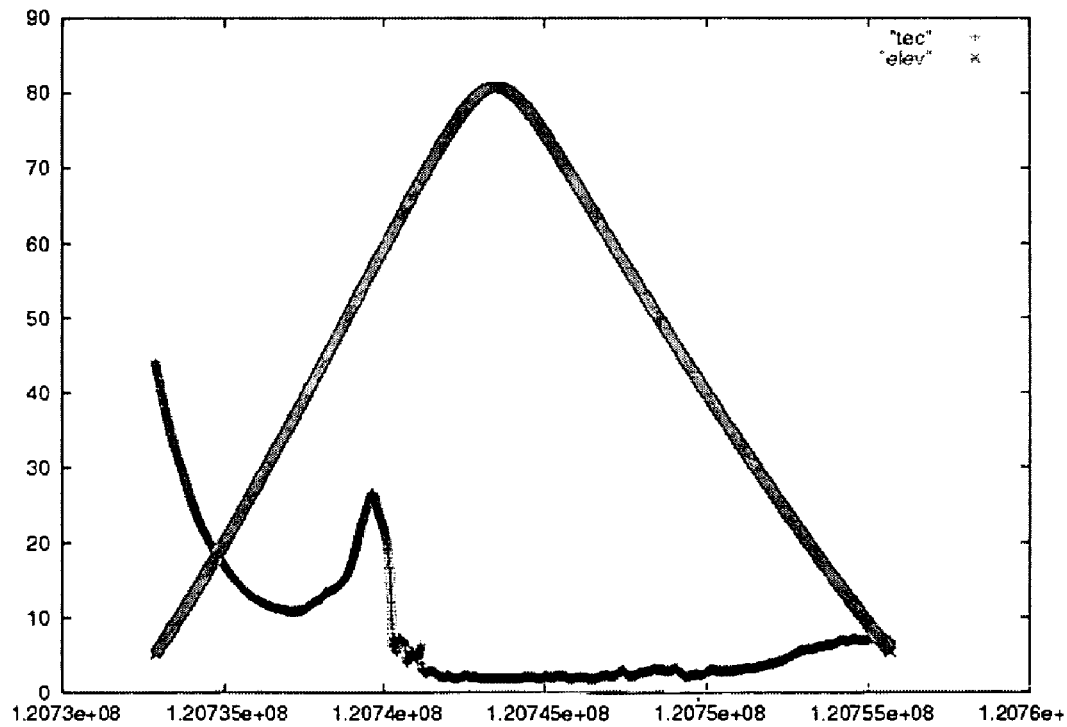

FIGS. 10-12 display three examples demonstrating significant data recovery. FIG. 10 illustrates a comparison of old 1002 and new supertruth 1004 values at ZDC (Leesburg, Va. area) for PRN11 (Pseudo Random Noise Code 11) on Oct. 29, 2003. Curve 1006 illustrates the elevation angle in degrees. Similarly, FIG. 11 illustrates new supertruth values at BIL (Billings, Mont. area) for PRN28 on Oct. 29, 2003 and FIG. 12 illustrates new supertruth values at ZSE (Auburn, Wash. area) for PRN7 on Oct. 29, 2003.

Logical Flow

Figure 13:
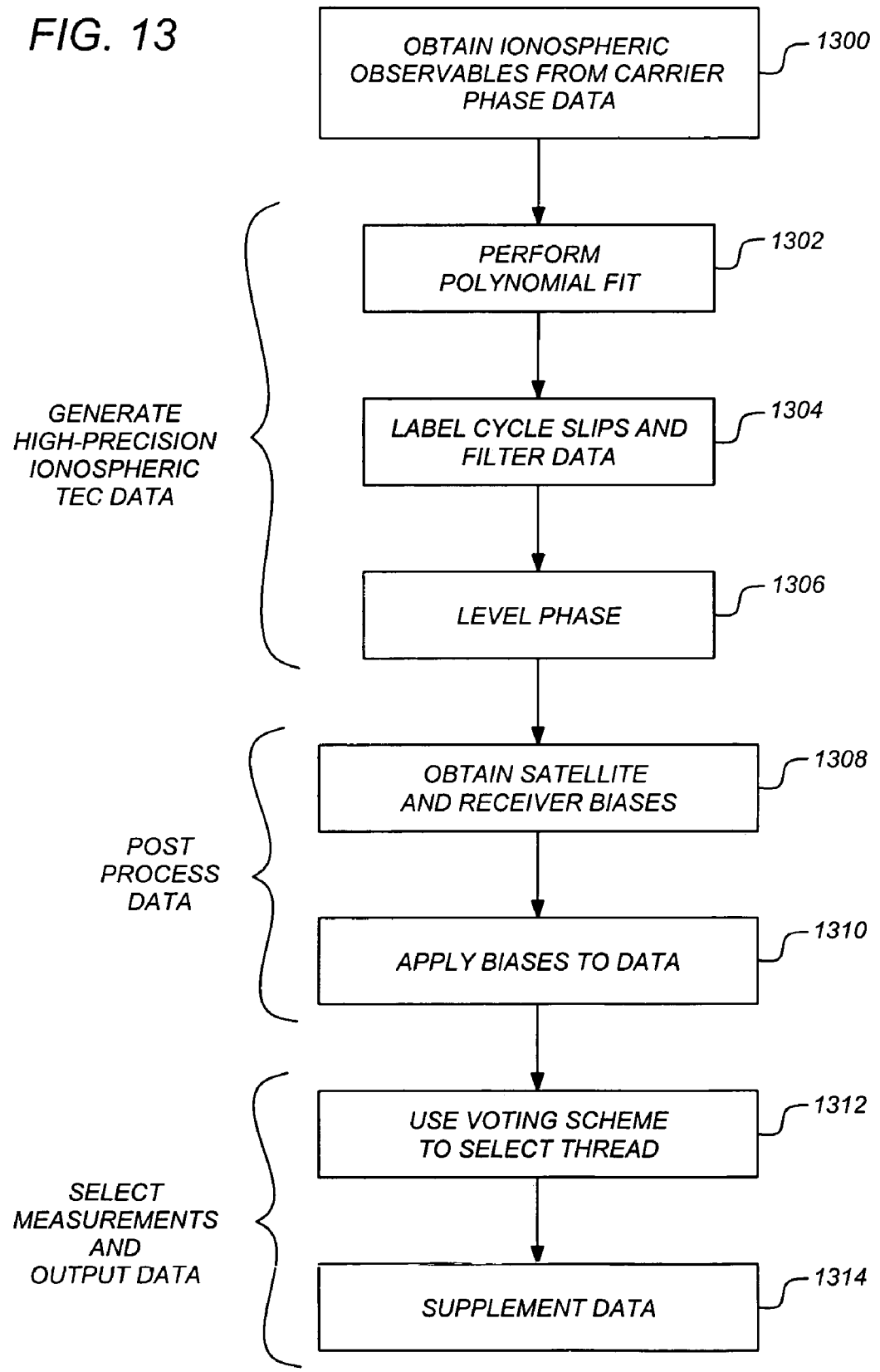
FIG. 13 is a flow chart illustrating the logical flow for providing ionospheric ground-truth measurements in accordance with one or more embodiments of the invention.

FIG. 13 is a flow chart illustrating the logical flow for providing ionospheric ground-truth measurements in accordance with one or more embodiments of the invention. At step 1300 ionospheric observables are obtained from pseudorange/code and carrier phase data from 75 WAAS Reference element (WRE) receives located at 25 WAAS reference site (WRS) locations (three co-located WRE receivers at each WRS).

As indicated above, the first stage of the process is a bias estimation part that generates high-precision ionospheric TEC data. The first stage of this process uses the data from the L1-L2 bands obtained at step 1300. For each phase arc on the L1-L2 phase observables, a polynomial fit is conducted at step 1302. The fit is examined to determine if there are any cycle slips in the observables. A slip detection parameter is used in this regard to determine if a particular jump between adjacent points should be interpreted as an outlier or as a cycle slip. Thus, at step 1304, the cycle slips are identified/labeled. Once labeled, the data is filtered (at step 1304) by removing data arcs longer than 5 minutes in duration to mitigate multipath error on the code measurements.

The last step in the generation of the high-precision ionospheric TEC data is to level the phase using the pseudorange/code measurements/data at step 1306. Each level is computed by averaging the phase observables (PI-LI) using an elevation-dependent weighting.

Once the leveled phase data has been obtained, the next stage of the process comprised of post processing is performed. At step 1308 satellite and receiver biases are obtained. Many methods may be used to obtain the satellite and receiver biases including a sequential least squares estimation method (e.g., Kalman filter). In this regard, the biases may be obtained via modeling of the ionospheric measurements. The modeled data may then be filtered (e.g., using a Kalman filter) that solves for the instrumental biases.

At step 1310, to correct the data, the biases are applied to the leveled and filtered phase data to obtain unbiased phase-leveled ionospheric TEC measurements (i.e., line-of-sight TEC measurements). As described above, since there are three co-located WRE receivers at each WRS location, TEC measurements from each of the WRE receivers are processed at steps 1300-1306. Further, the biases are applied to each of the three sets of measurements at step 1310.

Once the three threads of TEC data are obtained, a voting scheme is used to select one of the three measurements as a ground truth at step 1312. The voting algorithm may establish various criteria depending on whether all three measurements are available (e.g., or if only two are available), a range for the data, a threshold level, and a sigma value (scatter of leveled phase ionospheric observable) to minimize data loss.

After selecting an appropriate measurement using the voting scheme, the data provided to the WAAS Master station to correct for ionospheric delay is supplemented/based on the calculations at step 1314. Thus, the output of the process is the final "supertruth" data, intended to serve as ground-truth for WAAS algorithm development and validation purposes. In this regard, the X,Y,Z of the satellites (earth-centered geocentric coordinates), the difference in TEC between the supertruth value and the next closest thread value, satellite arc length in hours, and the highest elevation angle in degrees may be forwarded to the WAAS Master station for use in calculating the corrective information. Such data may be in addition to data traditionally sent to the WAAS Master station as described in the specification above.

REFERENCES

[1] Iijima, B. A., I. L. Harris, C. M. Ho, U. J. Lindqwister, A. J. Mannucci, X. Pi, M. J. Reyes, L. C. Sparks, B. D.

Wilson (1999). "Automated Daily Process for Global Ionospheric Total Electron Content Maps and Satellite Ocean Altimeter Ionospheric Calibration Based on Global Positioning System." *Journal of Atmospheric and Solar-Terrestrial Physics*, Vol. 61, pp. 1205-1218.

[2] Komjathy, A. (1997). *Global Ionospheric Total Electron Content Mapping Using the Global Positioning System.* Ph.D. dissertation, Department of Geodesy and Geomatics Engineering Technical Report No. 188, University of New Brunswick, Fredericton, New Brunswick, Canada, 248 pp.

[3] Komjathy, A., B. D. Wilson, T. F. Runge, B. M. Boulat, A. J. Mannucci, L. Sparks and M. J. Reyes (2002). "A New Ionospheric Model for Wide Area Differential GPS: The Multiple Shell Approach." *On the CD-ROM of the Proceedings of the National Technical Meeting of the Institute of Navigation*, San Diego, Calif., January 28-30.

[4] Lawson, C. (1984). "A Piecewise C2 Basis for Function Representation over a Surface of a Sphere." JPL internal document.

[5] Mannucci, A. J., B. D. Wilson, D. N. Yuan, C. H. Ho, U. J. Lindqwister and T. F. Runge (1998). "A Global Mapping Technique for GPS-derived Ionospheric Total Electron Content Measurements." *Radio Science*, Vol. 33, pp. 565-582.

[6] Mannucci A. J., B. A. Iijima, L. Sparks, X. Pi, B. D. Wilson and U. J. Lindqwister (1999). "Assessment of Global TEC Mapping Using a Three-Dimensional Electron Density Model." *Journal of Atmospheric and Solar Terrestrial Physics*, Vol. 61, pp. 1227-1236.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method, apparatus, and article of manufacture for providing calibrated high precision ionospheric delay measurements using triple redundant dual-frequency GPS receiver data. The motivation for the invention is to provide the best representation of the rapidly changing ionosphere during storm conditions. Using the invention, an average data volume improvement of about 30 percent over the old algorithm has been found. More importantly, critical data are recovered, that occurred during periods of significant ionospheric irregularity.

One difference between the old and new measurement systems include the use of 36 hours of 1 second data to perform a leveling as opposed to the 24 hour 5 second data sets used in the prior art. Valid data are rejected less often using less stringent editing criteria, and a number of changes in the supertruth voting scheme results in more data volume in the final supertruth. The addition of new columns to the supertruth data files supports improved quality check of the new supertruth data, as well as providing supertruth users with more flexibility when using the data for further developing WAAS capabilities.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for providing ionospheric ground-truth measurements for use in a wide-area augmentation system (WAAS), comprising:
    receiving ionospheric pseudorange data and phase data as observables;
    performing a polynomial fit on the observables;
    examining polynomial fit to identify any cycle slips in the observables;
    leveling the phase data using the pseudorange data;
    obtaining satellite and receiver biases; and
    applying the satellite and receiver biases to the leveled phase data to obtain unbiased phase-leveled ionospheric measurements that are used in a WAAS system.

2. The method of claim 1, wherein the leveling of the phase data comprises averaging the phase observables using an elevation-dependent weighting.

3. The method of claim 1, wherein:
    unbiased phase-leveled ionospheric measurements are obtained separately for two or more co-located GPS receivers; and
    the method further comprises using a voting scheme to select one of the two or more unbiased phase-leveled ionospheric measurements.

4. The method of claim 3, wherein the voting scheme utilizes criteria to select the unbiased phase-leveled ionospheric measurements, said criteria comprising:
    a twenty (20) percent (%) criterion of range agreement between the measurements if three measurements are available;
    a forty (40) percent (%) criterion of agreement between the measurements if two measurements are available;
    an upper and lower bounds on the data; and
    a sigma (scatter of the unbiased phase-leveled ionospheric measurements) criterion to minimize data loss.

5. The method of claim 3, further comprising providing supplemental data that provides information on a quality of individual data points used to determine corrective information for the wide-area augmentation system (WAAS), said supplemental data comprising:
    Earth-centered geocentric coordinates of a satellite used to transmit GPS data upon which the ionospheric observable phase data is based;
    a difference in total electron content between the unbiased phase-leveled ionospheric measurements and a next closest measurement from a co-located GPS receiver;
    satellite arc length in hours; and
    a highest elevation angle.

6. The method of claim 1, wherein the satellite and receiver biases are obtained by:
    obtaining 1-s RINEX dual-frequency pseudorange and carrier-phase observations;
    cleaning and decimating the observations to 300 s; and
    passing the cleaned and decimated observations through a sequential least squares estimator.

7. The method of claim 1, wherein the obtaining satellite and receiver biases uses a sequential least squares estimation method.

8. An apparatus for providing ionospheric ground-truth measurements for use in a Wide-Area Augmentation System (WAAS) comprising a WAAS receiver configured to:
    receive ionospheric pseudorange data and phase data as observables;
    perform a polynomial fit on the observables;
    examine the polynomial fit to identify any cycle slips in the observables;
    level the phase data using the pseudorange data;

obtain satellite and receiver biases; and apply the satellite and receiver biases to the leveled phase data to obtain unbiased phase-leveled ionospheric measurements that are used in a WAAS system.

9. The apparatus of claim 8, wherein the WAAS receiver is configured to level the phase data by averaging the phase observables using an elevation-dependent weighting.

10. The apparatus of claim 8, wherein:

unbiased phase-leveled ionospheric measurements are obtained separately for two or more co-located GPS receivers; and the WAAS receiver is further configured to use a voting scheme to select one of the two or more unbiased phase-leveled ionospheric measurements.

11. The apparatus of claim 10, wherein the voting scheme utilizes criteria to select the unbiased phase-leveled ionospheric measurements, said criteria comprising:

a twenty (20) percent (%) criterion of range agreement between the measurements if three measurements are available;

a forty (40) percent (%) criterion of agreement between the measurements if two measurements are available;

an upper and lower bounds on the data; and a sigma (scatter of the unbiased phase-leveled ionospheric measurements) criterion to minimize data loss.

12. The apparatus of claim 10, wherein the WAAS receiver is further configured to provide supplemental data that provides information on a quality of individual data points used to determine corrective information for the wide-area augmentation system (WAAS), said supplemental data comprising:

Earth-centered geocentric coordinates of a satellite used to transmit GPS data upon which the ionospheric observable phase data is based;

a difference in total electron content between the unbiased phase-leveled ionospheric measurements and a next closest measurement from a co-located GPS receiver;

satellite arc length in hours; and a highest elevation angle.

13. The apparatus of claim 8, wherein the satellite and receiver biases are obtained by:

obtaining 1-s RINEX dual-frequency pseudorange and carrier-phase observations;

cleaning and decimating the observations to 300 s; and passing the cleaned and decimated observations through a sequential least squares estimator.

14. The apparatus of claim 8, wherein the satellite and receiver biases are obtained using a sequential least squares estimation method.

15. An article of manufacture comprising a program storage medium readable by a computer and embodying one or more instructions executable by the computer to perform a method for providing ionospheric ground-truth measurements for use in a Wide Area Augmentation System (WAAS), the method comprising:

receiving ionospheric pseudorange data and phase data as observables;

performing a polynomial fit on the observables;

examining polynomial fit to identify any cycle slips in the observables;

leveling the phase data using the pseudorange data;

obtaining satellite and receiver biases; and applying the satellite and receiver biases to the leveled phase data to obtain unbiased phase-leveled ionospheric measurements that are used in a WAAS system.

16. The article of manufacture of claim 15, wherein the leveling of the phase data comprises averaging the phase observables using an elevation-dependent weighting.

17. The article of manufacture of claim 15, wherein:

unbiased phase-leveled ionospheric measurements are obtained separately for two or more co-located GPS receivers; and the method further comprises using a voting scheme to select one of the two or more unbiased phase-leveled ionospheric measurements.

18. The article of manufacture of claim 17, wherein the voting scheme utilizes criteria to select the unbiased phase-leveled ionospheric measurements, said criteria comprising:

a twenty (20) percent (%) criterion of range agreement between the measurements if three measurements are available;

a forty (40) percent (%) criterion of agreement between the measurements if two measurements are available;

an upper and lower bounds on the data; and a sigma (scatter of the unbiased phase-leveled ionospheric measurements) criterion to minimize data loss.

19. The article of manufacture of claim 17, further comprising providing supplemental data that provides information on a quality of individual data points used to determine corrective information for the Wide-Area Augmentation System (WAAS), said supplemental data comprising:

Earth-centered geocentric coordinates of a satellite used to transmit GPS data upon which the ionospheric observable phase data is based;

a difference in total electron content between the unbiased phase-leveled ionospheric measurements and a next closest measurement from a co-located GPS receiver;

satellite arc length in hours; and a highest elevation angle.

20. The article of manufacture of claim 15, wherein the satellite and receiver biases are obtained by:

obtaining 1-s RINEX dual-frequency pseudorange and carrier-phase observations;

cleaning and decimating the observations to 300 s; and passing the cleaned and decimated observations through a sequential least squares estimator.

21. The article of manufacture of claim 17, wherein the obtaining satellite and receiver biases uses a sequential least squares estimation method.

* * * * *